US012650036B2

(12) United States Patent
Guo et al.

(10) Patent No.: US 12,650,036 B2
(45) Date of Patent: Jun. 9, 2026

(54) METHOD FOR IMPROVING TENSILE STRENGTH OF THE WIRE LOCK AND THE WIRE LOCK

(71) Applicant: SHENZHEN WINS ELECTRONIC TECHNOLOGY CO., LTD., Shenzhen (CN)

(72) Inventors: Pingcheng Guo, Shenzhen (CN); Shengfei Zhao, Shenzhen (CN)

(73) Assignee: SHENZHEN WINS ELECTRONIC TECHNOLOGY CO., LTD., Shenzhen (CN)

( * ) Notice: Subject to any disclaimer, the term of this patent is extended or adjusted under 35 U.S.C. 154(b) by 84 days.

(21) Appl. No.: 18/811,323

(22) Filed: Aug. 21, 2024

(65) Prior Publication Data

US 2025/0122753 A1 Apr. 17, 2025

(30) Foreign Application Priority Data

Oct. 11, 2023 (CN) ......................... 202311317086.6

(51) Int. Cl.
*E05B 67/38* (2006.01)
*E05B 67/00* (2006.01)

(52) U.S. Cl.
CPC ............ *E05B 67/38* (2013.01); *E05B 67/003* (2013.01)

(58) Field of Classification Search
CPC ................... E05B 67/38; E05B 67/003; E05B 2015/1692; E05B 73/0029; E05B 67/04; E05B 73/0005; E05B 73/0017; E05B 73/0047; E05B 73/0052; E05B 73/0058; E05B 73/0064; G08B 13/2434
See application file for complete search history.

(56) References Cited

U.S. PATENT DOCUMENTS 5,068,643 A * 11/1991 Yashina ............. G08B 13/2434 340/687
5,072,213 A * 12/1991 Close ................. G08B 13/2431 340/568.4
5,097,253 A * 3/1992 Eschbach ............. G08B 13/126 340/545.4
6,003,348 A * 12/1999 McCrea ................ E05B 73/007 70/DIG. 57
6,144,301 A * 11/2000 Frieden ............ G06K 19/07758 40/664
6,243,005 B1 * 6/2001 Haimovich ........... G09F 3/0394 340/432
6,360,571 B1 * 3/2002 O'Neal ................... B60R 25/09 70/53

(Continued)

FOREIGN PATENT DOCUMENTS

EP 0933289 A1 * 8/1999 ........... E05B 67/063
GB 2569155 A * 6/2019 ......... E05B 73/0029
KR 101120512 B1 * 2/2012 ............. E05B 45/06

*Primary Examiner* — Christine M Mills
*Assistant Examiner* — Faria F Ahmad
(74) *Attorney, Agent, or Firm* — Birchwood IP

(57) ABSTRACT

The invention provides a method for improving the tensile strength of the wire lock and the wire lock. The wire lock is provided with a plastic shell and a wire rope, an RFID chip and a lock body are arranged inside the plastic shell, and a crossbeam is additionally arranged in the plastic shell; and the fixed end of the wire rope is connected with the crossbeam.

18 Claims, 6 Drawing Sheets

(56) References Cited

U.S. PATENT DOCUMENTS

| | | | | |
|---|---|---|---|---|
| 6,369,711 | B1 * | 4/2002 | Adams | G08B 13/2437 340/572.1 |
| 7,152,439 | B1 * | 12/2006 | Chang | E05B 37/025 24/134 P |
| 8,068,027 | B2 * | 11/2011 | Auerbach | G09F 3/0352 340/539.11 |
| 9,640,051 | B2 * | 5/2017 | Conaty | G08B 13/12 |
| 12,480,340 | B2 * | 11/2025 | Zhao | E05B 67/003 |
| 2002/0053228 | A1 * | 5/2002 | O'Neal | E05B 67/063 70/226 |
| 2004/0074265 | A1 * | 4/2004 | Bruening | E05B 69/00 70/57.1 |
| 2004/0139772 | A1 * | 7/2004 | Chang | E05B 67/02 70/52 |
| 2005/0155395 | A1 * | 7/2005 | Yu | E05B 35/105 70/284 |
| 2005/0235708 | A1 * | 10/2005 | Ling | E05B 37/025 70/30 |
| 2006/0130541 | A1 * | 6/2006 | Tollefson | B60D 1/60 70/49 |
| 2007/0152835 | A1 * | 7/2007 | Marsilio | E05B 45/005 340/572.9 |
| 2007/0180873 | A1 * | 8/2007 | Yen | A45C 13/12 70/63 |
| 2008/0236209 | A1 * | 10/2008 | Conti | G08B 13/1463 70/57.1 |
| 2008/0266111 | A1 * | 10/2008 | Shute | E05B 73/0017 340/572.9 |
| 2010/0231388 | A1 * | 9/2010 | Shute | G08B 13/2448 340/568.4 |
| 2011/0120197 | A1 * | 5/2011 | Molesan | A63C 11/006 70/58 |
| 2011/0260867 | A1 * | 10/2011 | McCracken | E05B 67/003 70/52 |
| 2011/0277700 | A1 * | 11/2011 | Friedland | E05B 73/0005 70/58 |
| 2012/0085134 | A1 * | 4/2012 | Ezzo | E05B 73/0017 70/15 |
| 2012/0227447 | A1 * | 9/2012 | Conti | E05B 73/0052 29/407.01 |
| 2015/0022359 | A1 * | 1/2015 | Joseph | E05B 45/06 340/572.9 |
| 2016/0140820 | A1 * | 5/2016 | Joseph | G08B 13/2462 340/572.1 |
| 2016/0162775 | A1 * | 6/2016 | Zeng | G08B 13/2434 235/375 |
| 2016/0163233 | A1 * | 6/2016 | Favier | G09F 3/0305 70/57.1 |
| 2017/0004691 | A1 * | 1/2017 | Alicot | G08B 13/2434 |
| 2018/0223566 | A1 * | 8/2018 | Smith | E05B 73/0005 |
| 2019/0057289 | A1 * | 2/2019 | Bauer | G08B 13/2445 |
| 2019/0186174 | A1 * | 6/2019 | Lam | E05B 63/0065 |
| 2020/0291684 | A1 * | 9/2020 | Kinas | G07C 9/00944 |
| 2022/0130221 | A1 * | 4/2022 | Miller | G08B 13/1445 |
| 2023/0258026 | A1 * | 8/2023 | Bullard | G09F 3/0329 70/51 |
| 2024/0368923 | A1 * | 11/2024 | Zhao | E05B 67/38 |
| 2024/0368924 | A1 * | 11/2024 | Zhao | E05B 73/0029 |
| 2024/0371243 | A1 * | 11/2024 | Zhao | G08B 13/2434 |
| 2024/0384563 | A1 * | 11/2024 | Ramakrishna | E05B 17/2092 |
| 2024/0392609 | A1 * | 11/2024 | Schein | E05B 37/0058 |
| 2025/0087071 | A1 * | 3/2025 | Zhou | G08B 13/2431 |
| 2025/0129641 | A1 * | 4/2025 | Becker | E05B 73/0005 |
| 2025/0157310 | A1 * | 5/2025 | Panico | G08B 13/1445 |

* cited by examiner

METHOD FOR IMPROVING TENSILE STRENGTH OF THE WIRE LOCK AND THE WIRE LOCK

CROSS-REFERENCE TO RELATED APPLICATIONS

This application claims priority to Chinese Patent Application No. 202311317086.6, filed on Oct. 11, 2023, which is hereby incorporated by reference in its entirety.

TECHNICAL FIELD

The present invention relates to the improvement of wire locks, and in particular to a method for improving the tensile strength of the wire lock and wire the lock using the corresponding method.

BACKGROUND

The wire lock industry has a tensile certification ISO17712 standard, wire locks are classified into three levels: "I" level, "S" level and "H" level, which correspond to different pulling force values. Currently, most of the existing wire locks use plastic shells, so their tensile strength can only reach "S" level. If you want to reach the "H" level, you need to use a metal shell. However, if a metal shell is used, an RFID chip cannot be embedded, because the metal shell will shield the signal of the RFID chip.

The basic working principle of RFID is that the reader/writer sends a radio frequency signal of a specific frequency through a transmitting antenna. When the electronic tag enters the working area where the RF signal is located, it will generate induced current, thereby obtaining energy and activating the electronic tag, which causes the electronic tag to send its own identification information through the built-in RF antenna. The receiving antenna of the reader/writer receives the modulated signal sent from the tag, which is transmitted to the reader/writer signal processing module through the antenna adjuster. The demodulated and decoded effective information is sent to the back end host system for relevant processing. The host system identifies the identity of the tag based on logical operations, performs corresponding processing and control for different settings, and finally sends command signals to control the reader to complete the corresponding read and write operations. Electromagnetic waves will reflect and refract when they encounter different media during a propagation. The law of reflection and refraction is given by the Fresnel formula. Due to the presence of many free electrons in metal bodies, their conductivity is relatively high. In this way, the loss of the refracted wave will be significant, and the reflection will also increase. So, electromagnetic waves are difficult to penetrate metal bodies and have a shielding effect. Therefore, if a metal shell is used, the RFID chip cannot be embedded. If a plastic casing is used, although the RFID chip can be embedded, it is difficult to meet the tensile requirements.

In summary, how to improve the tensile strength of wire locks, which can not only embed the RFID chip, but also meet the high-strength tensile requirements and achieve a wider range of scene requirements, is an urgent technical problem that needs to be solved by those skilled in the art.

SUMMARY

In order to solve the problems in the prior art, the present invention provides a method for improving the tensile strength of the wire lock and the wire lock using the corresponding method.

The invention provides a method for improving the tensile strength of the wire lock and the wire lock that using the corresponding method. The wire lock has a plastic shell and a wire rope. The plastic shell is equipped with an RFID chip and a lock body, and the wire rope includes a fixed end and a movable end, and a crossbeam is provided inside the plastic shell, and the wire rope is connected to the crossbeam. One end of the wire rope is the fixed end. The wire rope is connected to the crossbeam through the fixed end. The fixed end can be connected to the crossbeam in various forms, such as A hole or groove can be provided at one end of the crossbeam to connect to the fixed end of the wire rope. The fixed end of the wire rope can be directly connected to the crossbeam, or indirectly connected to the crossbeam, for example, the fixed end of the wire rope is connected to the crossbeam through another additional component.

The other end of the wire rope is the movable end, which can be inserted into the lock body to achieve locking. When in the locked state, the movable end of the wire rope can be directly inserted into the lock body, or can be inserted into the lock body after passing through the crossbeam. For example, a hole, or a groove can be provided on the crossbeam for the movable end of the wire rope to pass through.

The crossbeam can be in various shapes, such as strips, rings, triangles, polygons, etc.

As a further improvement of the present invention, the wire rope is directly fixed to the crossbeam, or the wire rope is first connected with a wire rope fixing block, and then both of them are fixed to the crossbeam. Preferably, the wire rope is first connected with a wire rope fixing block, and then both of them are fixed to the crossbeam.

As a further improvement of the present invention, the crossbeam is set on the upper part or lower part of the lock body. Preferably, the crossbeam is set on the upper part of the lock body.

As a further improvement of the present invention, the lock body is a one-way lock body.

As a further improvement of the present invention, a first through hole and a second through hole for the wire rope to pass through are respectively provided at the left end and the right end of the crossbeam. The first through-hole is used for inserting the fixed end of the wire rope, and the second through-hole is used for inserting the movable end of the wire rope.

As a further improvement of the present invention, the crossbeam is made of high-strength materials, such as metal (steel, aluminum alloy and other common metals), glass fiber or other common high-strength materials.

As a further improvement of the present invention, the crossbeam is made of high-strength materials, such as metals (commonly used metals such as steel and aluminum alloys), fiberglass, or other common high-strength materials.

As a further improvement of the present invention, fixing the fixed end of the wire rope to the crossbeam specifically includes: firstly, fix the fixed end of the wire rope on the wire rope fixing block, and then pass the movable end of the wire rope through the crossbeam. Preferably, drill a hole on the wire rope fixing block, pass the wire rope through the hole, and then punch and rivet the wire rope to achieve a fixed connection between the wire rope and the wire rope fixing block.

As a further improvement of the present invention, set a step surface on the wire rope fixing block, and then attach the step surface of the wire rope fixing block to the crossbeam; By setting the wire rope fixing block to include an insertion section and a blocking section, wherein the insertion section is fixedly connected to the blocking section, and at the connection point, the blocking section protrudes from the insertion section, and the protruding area of the blocking section and the insertion section together form the aforementioned step surface.

As a further improvement of the present invention, connect the fixed end of the wire rope to the insertion portion of the wire rope fixing block, and then insert both of them together into the crossbeam.

As a further improvement of the present invention, the wire rope fixing block is made of high-strength material, and the strength of the material used for the wire rope fixing block is higher than the material used for the plastic shell.

As a further improvement of the present invention, the wire rope fixing block is made of high-strength materials, such as metal (common used metals such as steel and aluminum alloys), or other common high-strength materials. The selection of materials can be adjusted according to the design thickness and size to meet the strength requirements.

As a further improvement of the present invention, the wire rope fixing block is made of metal, such as commonly used metal materials, which can meet the strength requirements.

As a further improvement of the present invention, the lock body and the wire rope fixing block are located on the same side of the crossbeam, and the lock body is a one-way lock body, which can realize one-way locking of the wire rope.

As a further improvement of the present invention, the lock body is attached to the crossbeam.

As a further improvement of the present invention, the lock body is made of metal, such as commonly used metal materials, which can meet the strength requirements.

The invention also provides a wire lock, comprising a plastic shell and a wire rope, wherein the plastic shell is embedded with an RFID chip and a lock body. The wire rope comprises a fixed end and a movable end. It is characterized in that: a crossbeam is provided inside the plastic shell. The fixed end of the wire rope is connected to the crossbeam.

As a further improvement of the present invention, a wire rope fixing block is provided in the plastic shell, and the fixed end of the wire rope is connected to the crossbeam through the wire rope fixing block.

As a further improvement of the present invention, the crossbeam is set on the upper part or lower part of the lock body.

As a further improvement of the present invention, the lock body is a one-way lock body.

As a further improvement of the present invention, the crossbeam is made of high-strength material.

As a further improvement of the present invention, the crossbeam is made of metal or fiberglass.

As a further improvement of the present invention, the wire rope fixing block includes an insertion section and a blocking section.

As a further improvement of the present invention, the fixed end of the wire rope is fixedly connected to the insertion portion of the wire rope fixing block.

As a further improvement of the present invention, the wire rope fixing block is made of high-strength material.

As a further improvement of the present invention, the wire rope fixing block is made of metal.

As a further improvement of the present invention, the lock body and the wire rope fixing block are located on the same side of the crossbeam.

As a further improvement of the present invention, the lock body is attached to the crossbeam.

As a further improvement of the present invention, the lock body is made of metal.

The beneficial effects of the present invention are by combining the plastic shell with a crossbeam. On the one hand, the plastic shell can be used to realize the built-in RFID chip, which avoids the problem of signal shielding in traditional metal shell. On the other hand, improving the strength of the wire rope relative to the overall separation of the plastic shell through crossbeams. It can meet the high-strength tensile requirements and realize usage in a wider range of scenarios.

BRIEF DESCRIPTION OF DRAWINGS

In order to explain the technical solutions of the embodiments of the present invention more clearly, the drawings needed to be used in the description of the embodiments will be briefly introduced below. Obviously, the drawings in the following description are only some embodiments of the present invention. For those of ordinary skill in the art, other solutions can be obtained based on these drawings without exerting creative efforts.

DETAILED DESCRIPTION OF THE EMBODIMENTS

It should be noted that, as long as there is no conflict, the embodiments and features in the embodiments of the present invention can be combined with each other.

In the description of the present invention, it should be understood that the terms “center”, “longitudinal”, “transverse”, “up”, “down”, “front”, “back”, “left”, “right”, “vertical”, “horizontal”, “top”, “bottom”, “inside”, “outside” and other directional or positional relationships indicated are based on the directional or positional relationships shown in the accompanying drawings, only for the convenience of describing the present invention and simplifying the description, and do not indicate or imply that the device or element referred to must have a specific orientation, be constructed and operated in a specific orientation, and therefore cannot be understood as limiting the scope of protection of the present invention. In addition, the terms “first”, “second”, etc. are only used for descriptive purposes and cannot be understood as indicating or implying relative importance or implying the number of technical features indicated. Thus, features limited to “first”, “second”, etc. may explicitly or implicitly include one or more of these features. In the description of the present invention, unless otherwise specified, the meaning of “multiple” refers to two or more.

In the description of the present invention, it should be noted that unless otherwise specified and limited, the terms “set”, “embedded”, “provided”, “provided”, “install”, “connected”, “connection”, etc. should be broadly understood, for example, they can be fixed connections, detachable connections, or integral connections; It can be directly connected, indirectly connected through an intermediate medium, or connected internally between two components. For ordinary technical personnel in this field, the specific meanings of the above terms in the present invention can be understood through specific situations.

The present invention will be further explained in conjunction with the accompanying drawings and specific implementation methods.

Embodiment 1

Figure 1:
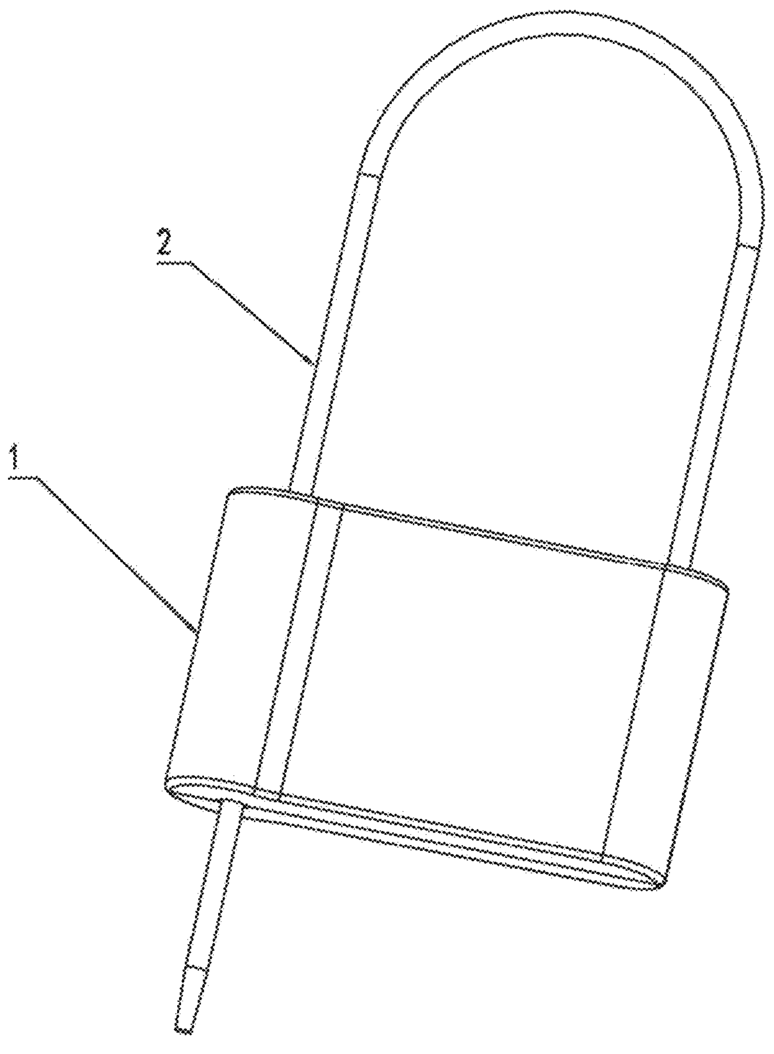
FIG. 1 is a schematic diagram of the wire lock according to the method of improving the tensile strength of the wire lock according to the present invention.
Figure 2:
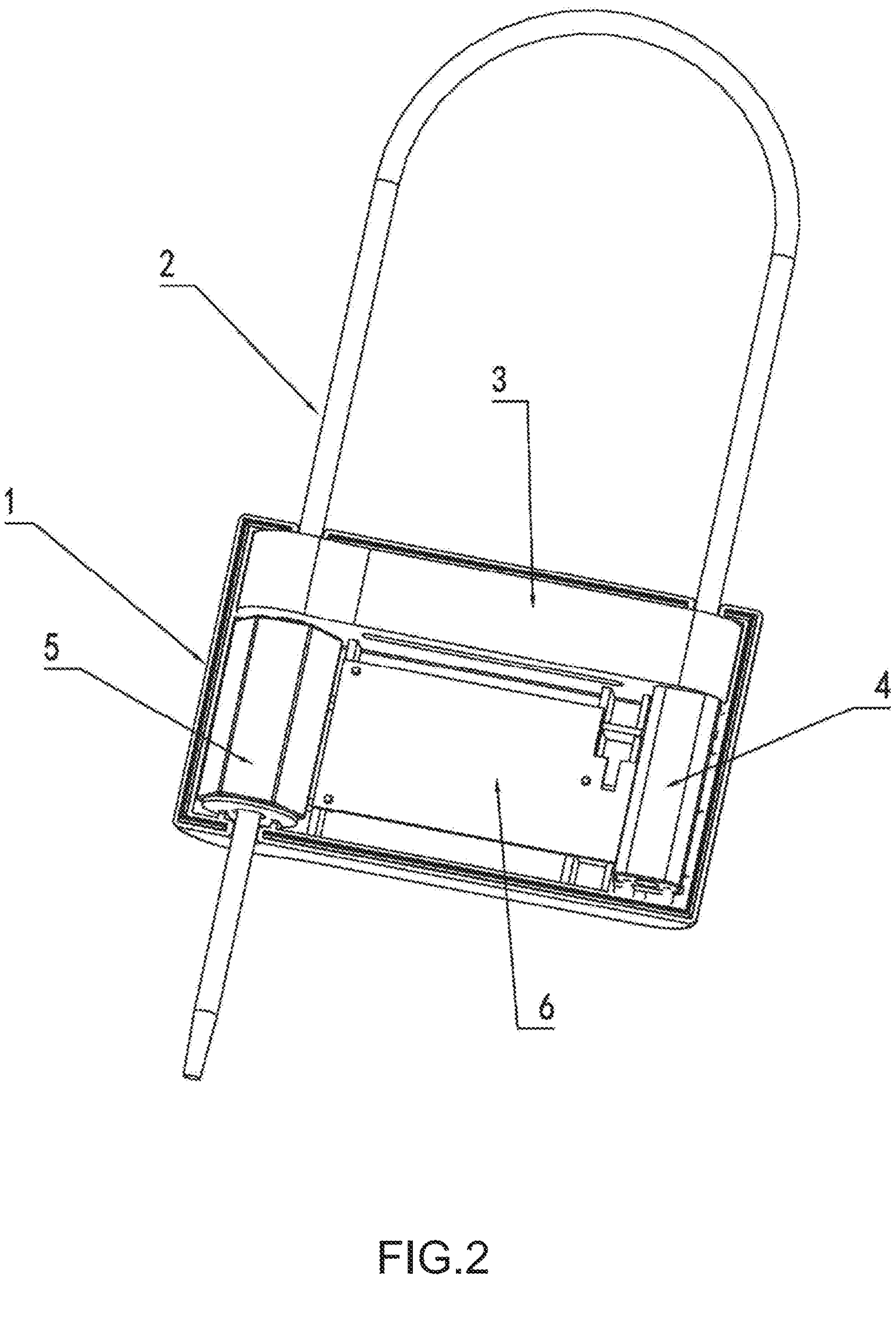
FIG. 2 is an internal schematic diagram of the wire lock of the present invention.
Figure 3:
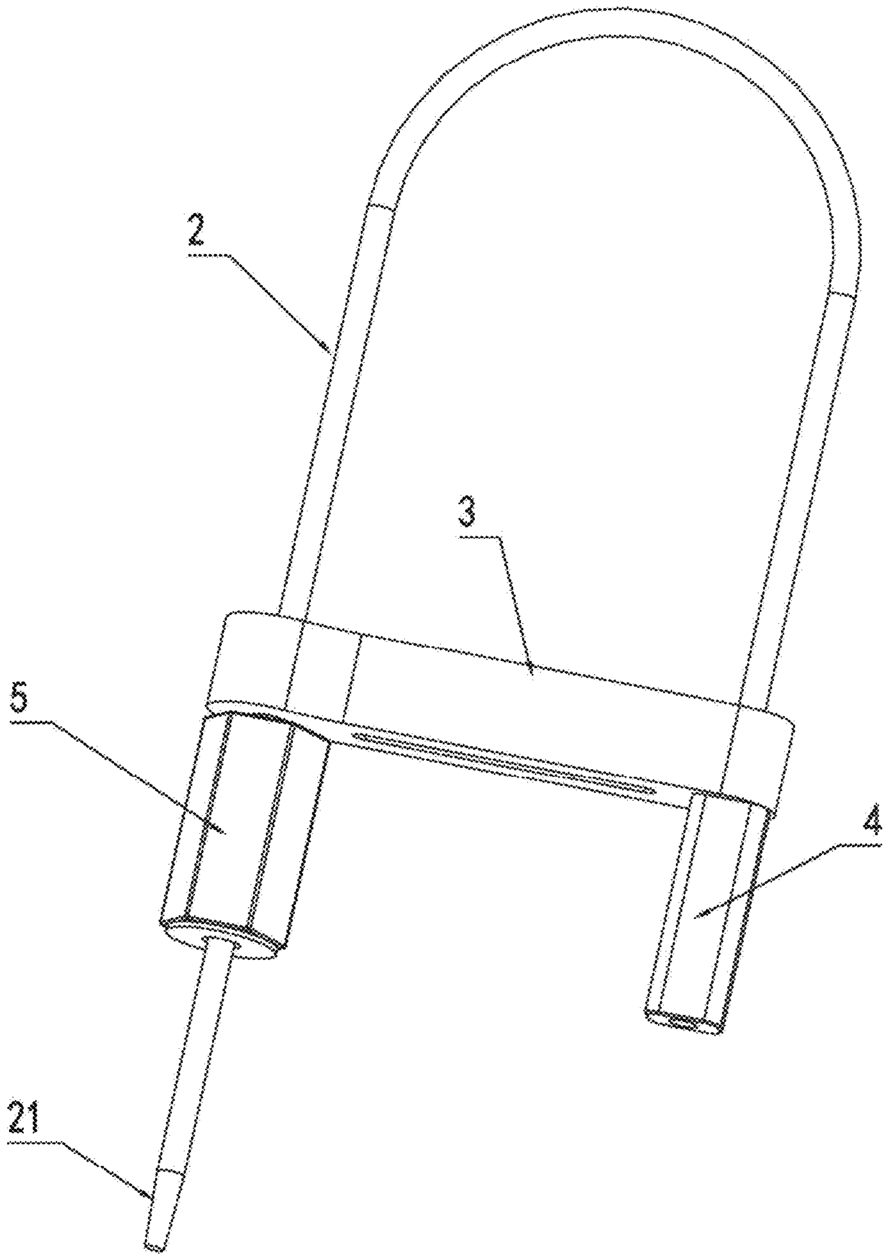
FIG. 3 is a partial assembly diagram of the wire lock of the present invention.
Figure 4:
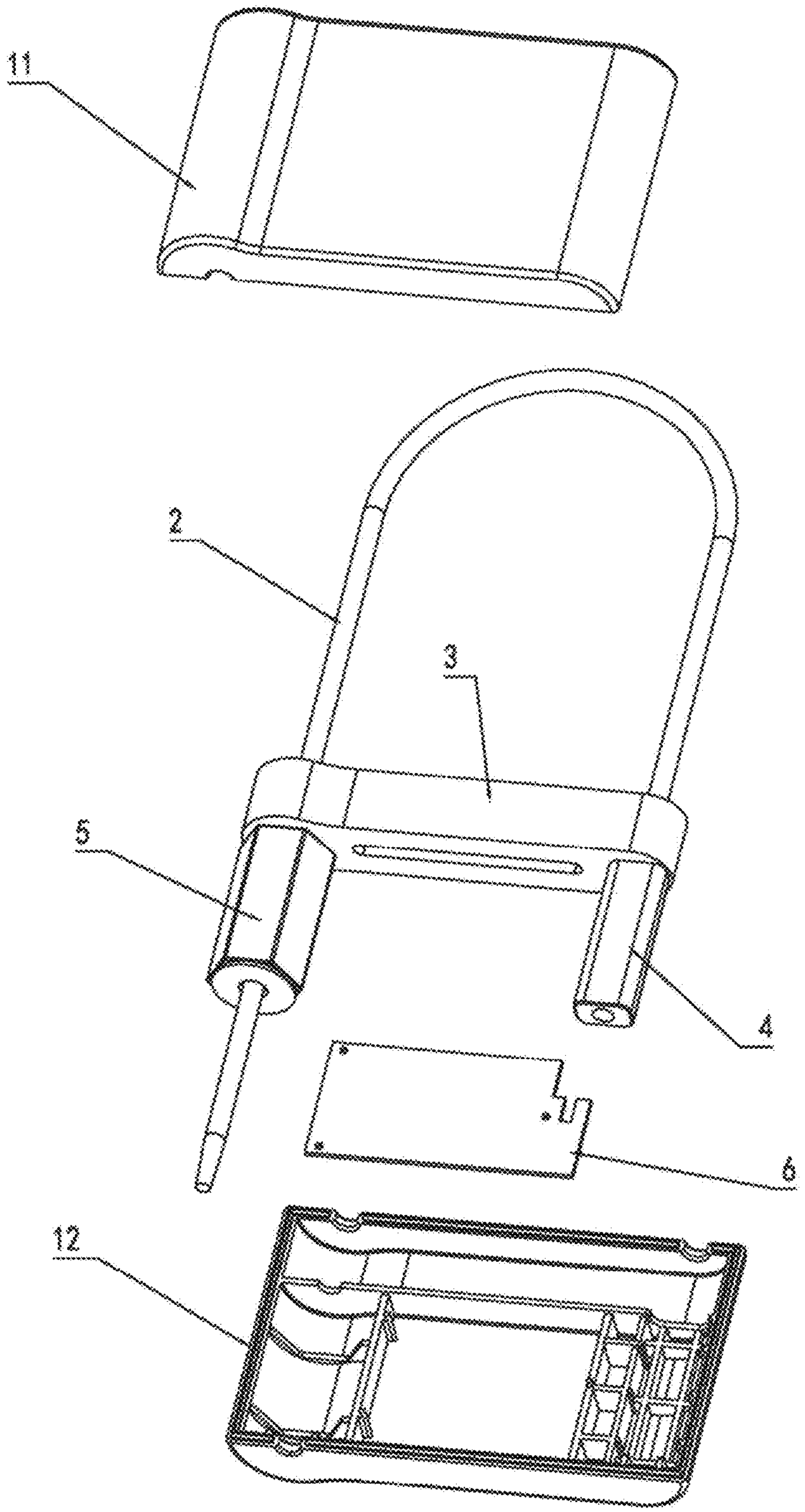
FIG. 4 is an exploded schematic diagram of the wire lock of the present invention.
Figure 5:
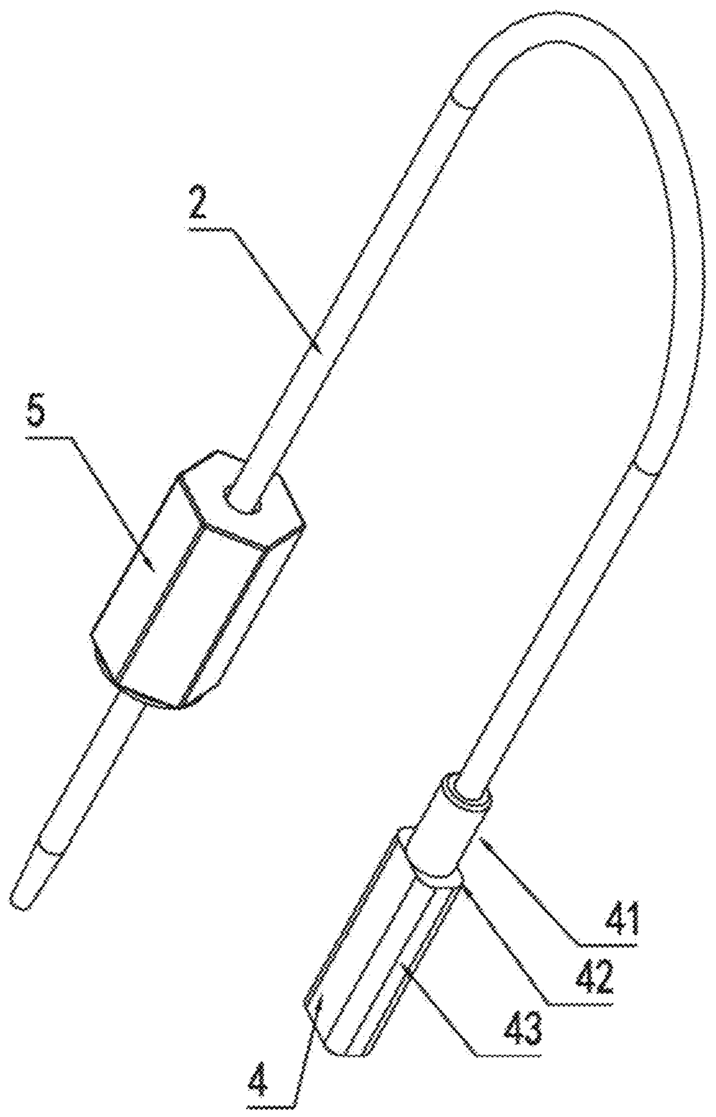
FIG. 5 is a partial assembly diagram of the wire lock of the present invention.
Figure 6:
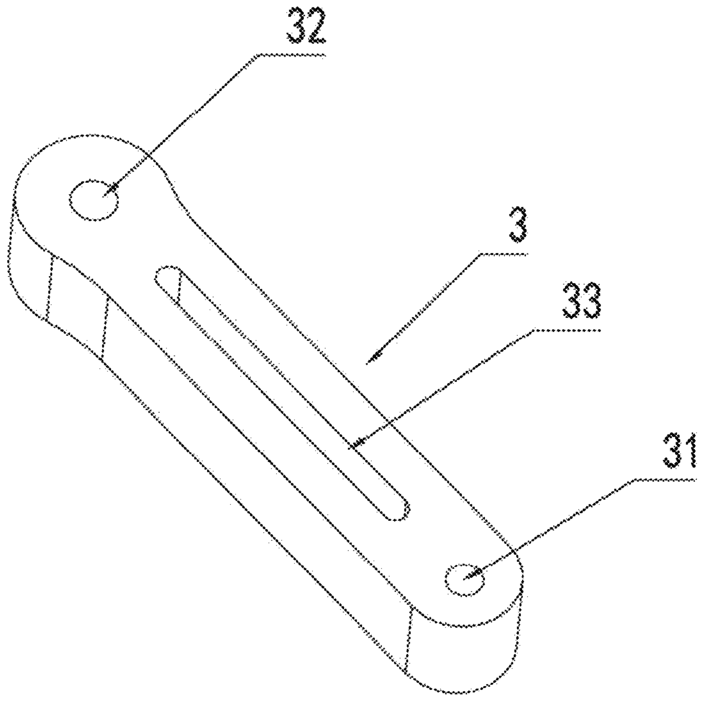
FIG. 6 is a schematic diagram of the crossbeam of the wire lock of the present invention.

As shown in FIGS. 1 to 6, a method of improving the tensile strength of the wire lock is to install a crossbeam 3 and a lock body 5 inside a plastic shell 1, and define the two ends of the wire rope 2 as the fixed end (located within the wire rope fixing block 4 but not shown). and the movable end 21, respectively, fix the fixed end of the wire rope 2 to the crossbeam 3. When locking, the movable end 21 of the wire rope 2 is first passed through the crossbeam 3 and then through the lock body 5, and the wire rope 2 is one-way locked by the lock body 5. After locking, the tensile force on the wire rope 2 will first act on the crossbeam 3 and then be transmitted to the plastic shell 1. Through the crossbeam 3, the force between the wire rope and the plastic shell can be improved to the force between the wire rope 2 and the crossbeam 3, which can effectively increase the strength of the wire rope 2 relative to the overall separation of the plastic shell.

Embodiment 2

As shown in FIGS. 1 to 6, a wire lock, comprising a plastic shell 1, a wire rope 2, a crossbeam 3 and a lock body 5. The crossbeam 3 and the lock body 5 are installed inside the plastic shell 1. And define the two ends of the wire rope 2 as the fixed end (located within the wire rope fixing block 4 but not shown). And the movable end 21, respectively. When locking, the movable end 21 of the wire rope 2 is first passed through the crossbeam 3 and then through the lock body 5, and the wire rope 2 is one-way locked by the lock body 5. After locking, the tensile force on the wire rope 2 will first act on the crossbeam 3 and then be transmitted to the plastic shell 1. Through the crossbeam 3, the force between the wire rope and the plastic shell can be improved to the force between the wire rope 2 and the crossbeam 3, which can effectively increase the strength of the wire rope 2 relative to the overall separation of the plastic shell.

Embodiment 3

Embodiment 3, proposes further improvements to the structure of crossbeam 3 based on Embodiment 1 and Embodiment 2.A first through hole 31 and a second through hole 32 are respectively opened at the left end and the right end of the crossbeam 3 for the wire rope 2 to pass through.

The wire rope 2 can be threaded through the first through-hole 31 first, and when locking, the wire rope 2 can be threaded through the second through-hole 32 for locking.

Embodiment 4

Embodiment 4, proposes further improvements to the material of crossbeam 3 based on Embodiment 1 and Embodiment 2. The strength of the material used for the crossbeam 3 is higher than that of the material used for plastic shell 1. The high-strength crossbeam 3 can withstand the tension of wire rope 2, which is beneficial for improving the overall separation strength of wire rope 2 relative to the plastic shell.

Embodiment 5

Embodiment 5, proposes further improvements to the material of crossbeam 3 based on Embodiment 1 and Embodiment 2. The crossbeam 3 is made of high-strength material, which can withstand the tensile force of the wire rope 2 with the high-strength crossbeam 3, which is conducive to improving the strength of the overall separation of the wire rope 2 from the plastic shell.

Embodiment 6

Embodiment 6, proposes further improvements to the material of crossbeam 3 based on Embodiment 1 and Embodiment 2. By combining the plastic shell 1 with the metal crossbeam 3, the metal crossbeam 3 can withstand the tension of the wire rope 2, which is beneficial for improving the strength of the overall separation of the wire rope 2 from the plastic shell.

Embodiment 7

Embodiment 7, proposes further improvements to the material of crossbeam 3 based on Embodiment 1 and Embodiment 2. The crossbeam 3 is made of glass fiber. By combining the plastic shell 1 with the glass fiber made crossbeam 3, the glass fiber made crossbeam 3 can withstand the tension of the wire rope 2, which is beneficial for improving the strength of the overall separation of the wire rope 2 from the plastic shell.

Embodiment 8

On the basis of Embodiments 1 and 2, in order to further enhance the strength of the separation of the wire rope 2 from the plastic shell as a whole, a wire rope fixing block is added to fix one end of the wire rope 2. Fixing the fixed end of the wire rope 2 to the crossbeam 3, specifically includes as follows: first fixing the fixed end of the wire rope 2 to the wire rope fixing block 4, and then passing the movable end 21 of the wire rope 2 through the crossbeam 3.

For example, the fixed end of the wire rope 2 can be fixed on the wire rope fixing block 4 by riveting.

Embodiment 9

Embodiment 9: On the basis of Embodiment 8, further improvements are made to the structure of the wire rope fixing block 4. The wire rope fixing block 4 is provided with a step surface 42. The step surface 42 of the wire rope fixing block 4 is attached to the crossbeam 3. The step surface 42 can form a structure similar to a hanging platform and be hung on the crossbeam 3. When the wire rope 2 is subjected to tension, The tension of the wire rope 2 is transmitted to the crossbeam 3 through the step surface 42. On the one hand, it can achieve the installation of the wire rope 2, and on the other hand, it can effectively transmit the tension to the crossbeam 3

Embodiment 10

Embodiment 10: On the basis of Embodiment 9, further improvements are made to the structure of the wire rope fixing block 4. The step surface 42 of the wire rope fixing block 4 divides the wire rope fixing block 4 into an insertion section 41 and a blocking section 43. The blocking section 43 is the big end and the insertion section 41 is the small end.

The fixed end of the wire rope 2 is fixedly connected to the insertion portion 41 of the wire rope fixing block 4, and the fixed end of the wire rope 2 and the insertion portion 41 of the wire rope fixing block 4 are inserted together into the first through hole 31 of the crossbeam 3.

The blocking portion 43 cannot pass through the first through hole 31.

Embodiment 11

Embodiment 11, on the basis of Embodiment 8, further improvements are made to the material of the wire rope fixing block 4. The strength of the material used in the wire rope fixing block 4 is higher than that of the material used in the plastic shell 1. The higher strength wire rope fixing block 4 and the crossbeam 3 can bear the tensile force of the wire rope 2, which is beneficial to improving the strength of the overall separation of the steel wire rope 2 from the plastic shell.

Embodiment 12

Embodiment 12, on the basis of Embodiment 8, further improvements are made to the material of the wire rope fixing block 4. The wire rope fixing block 4 is made of high-strength material. The higher strength wire rope fixing block 4 and the crossbeam 3 can bear the tensile force of the wire rope 2, which is beneficial to improving the strength of the overall separation of the steel wire rope 2 from the plastic shell.

Embodiment 13

Embodiment 13, on the basis of Embodiment 8, further improvements are made to the material of the wire rope fixing block 4. The wire rope fixing block 4 is made of metal, also known as the metal wire rope fixing block. The metal wire rope fixing block 4 and the crossbeam 3 can bear the tensile force of the wire rope 2, which is beneficial to improving the strength of the overall separation of the steel wire rope 2 from the plastic shell.

Embodiment 14

Embodiment 14, on the basis of Embodiment 8, further improvements are made to the structure of the lock body 5. The lock body 5 and the wire rope fixing block 4 are located on the same side of the crossbeam 3. The same side of the crossbeam 3 simultaneously bears the tensile force from the lock body 5 and the wire rope fixing block 4, which is beneficial to improving the strength of the overall separation of the wire rope 2 relative to the plastic shell. Moreover, the crossbeam 3 can balance and absorb the separation force between the wire rope 2 and the wire rope fixing block 4 or the lock body 5, which can increase the stress-bearing area of the plastic shell 1 to meet the H-level tensile force requirements.

Embodiment 15

Embodiment 15, on the basis of Embodiments 1 and 2, further improvements are made to the structure of the lock body 5. The lock body 5 is attached to the crossbeam 3. After locking, the tensile force on the movable end 21 of the wire rope 2 is transmitted to the crossbeam 3 by the lock body 5, while the tensile force on the fixed end of the wire rope 2 is transmitted to the crossbeam 3 by the wire rope fixing block 4. This is beneficial for improving the strength of the overall separation of the wire rope 2 relative to the plastic shell. Moreover, the crossbeam 3 can balance and absorb the separation force between the wire rope 2 and the wire rope fixing block 4 or the lock body 5, which can increase the stress-bearing area of the plastic shell 1. force area to meet the H-level tensile force requirements.

Embodiment 16

Embodiment 16: On the basis of Embodiments 1 and 2, further improvements are made to the material of the lock body 5. The lock body 5 is made of metal, and the high-strength lock body 5 can bear the tensile force of the wire rope 2, which is beneficial to improving the strength of the wire rope 2 relative to the overall separation of the plastic shell.

Embodiment 17

Embodiment 17: On the basis of Embodiments 1 and 2, an RFID chip is built-in. The wire lock also includes an RFID chip 6, which is built inside the plastic shell 1.

The RFID chip 6 can be installed on the circuit board to form a chip antenna integrated circuit board.

Preferably, the wire lock is a tag wire lock, such as an RFID tag wire lock.

Embodiment 18

Embodiment 18 further improves the structure of the plastic shell 1 based on the first and second embodiments. The plastic shell 1 includes a plastic bottom case 12 and a plastic top case 11. The plastic bottom case 12 is connected to the plastic top case 11. For example, the plastic bottom case 12 and the plastic top case 11 can be assembled through an ultrasonic welding process.

Embodiment 19

Embodiment 19, on the basis of Embodiments 1 and 2, further improvements are made to the structure of the wire lock to effectively increase the strength of the wire rope 2 relative to the overall separation of the plastic shell. The strength of the crossbeam 3 is higher than that of the plastic shell 1. The crossbeam 3 is made of high-strength material. The wire lock also includes a wire rope fixing block 4. The wire rope fixing block 4 is set inside the plastic shell 1. One end of the wire rope 2 is a fixed end. The other end is the movable end 21. The fixed end of the wire rope 2 is fixedly connected to the wire rope fixed block 4. The fixed end of the wire rope 2 can be fixed on the wire rope fixed block 4 by riveting. The wire rope fixed block 4 is provided with a step surface 42, the step surface 42 of the wire rope fixing block 4 is attached to the crossbeam 3, the step surface 42 of the wire rope fixing block 4 divides the wire rope fixing block 4 into an insertion section 41 and a blocking section 43, and the fixed end of the wire rope 2 is fixedly connected to the insertion section 41, the insertion section 41 is inserted into the first through hole 31, and the blocking section 43 cannot pass through the first through hole 31. The strength of the wire rope fixing block 4 is higher than that of the plastic shell 1. The wire rope fixing block 4 is made of high-strength material, and the wire lock also includes a lock body 5. When locking, the movable end 21 of the wire rope 2 is inserted into the lock body 5. The lock body 5 is attached to the crossbeam 3. The lock body 5 and the wire rope fixed block 4 are located on the same side of the crossbeam 3. The lock body 5 Made of metal, the crossbeam 3 is provided with a groove 33. The groove 33 can reduce the overall weight of the crossbeam. The shape, size and location of the groove 33 can be adjusted according to the needs of weight reduction and the strength of the crossbeam 3; Preferably, the shape of the groove 33 is a long and narrow shape arranged parallel to the crossbeam 3, and is arranged in the center of the crossbeam 3. The wire lock also includes an RFID chip 6, and the RFID chip 6 is located inside the plastic shell 1.

Tensile Test:

Testing instrument: Universal testing machine (No. TG0103);

Ambient temperature: 19° C.;

Relative humidity: 61%;

Specification number: ISO 17712:2013(E);

Clamp the wire lock seal in the stretching machine and apply tension.

TABLE 1

| Experimental results | | | |
|---|---|---|---|
| Sample number | Load demand before failure | Result (kN) | Classification of seals |
| 304116-70966 | 10.0 KN: High safety seal | 10.9 | High safety seal (H) |
| 304116-70968 | 2.27 KN: Security seal | 10.7 | High safety seal (H) |
| 304116-70992 | <2.27 KN: Indicative seal | 10.6 | High safety seal (H) |
| 304116-71031 | | 11.9 | High safety seal (H) |
| 304116-71047 | | 10.4 | High safety seal (H) |

The invention provides a method for improving the tensile strength of the wire lock and the wire lock using the corresponding method. During installation, inside the plastic shell 1, one end of the wire rope 2 is riveted and fixed with the wire rope fixing block 4. The insertion section 41 of the wire rope fixing block 4 is inserted into the first through hole 31 of the crossbeam 3. When locking, the movable end 21 of the wire rope 2 passes through the second through hole 32 of the crossbeam 3 and penetrates into the lock body 5 to complete the locking. The wire rope 2 is pulled by an external force. At this time, the crossbeam 3 can balance and absorb the separation force between the wire rope 2 and the wire rope fixing block 4 or the lock body 5, which can increase the force area of the plastic shell 1 to meet the H-level tensile requirements.

The above content is a further detailed description of the present invention in combination with specific preferred embodiments, and it cannot be concluded that the specific implementation of the present invention is limited to these descriptions. For those of ordinary skill in the technical field to which the present invention belongs, several simple deductions or substitutions can be made without departing from the concept of the present invention, and all of them should be regarded as belonging to the protection scope of the present invention.

What is claimed is:

1. A method for improving the tensile strength of a wire lock, the method comprising:

the wire lock has a plastic shell and a wire rope;

the plastic shell is equipped with an RFID chip and a lock body inside;

the wire rope comprises a fixed end and a movable end;

a crossbeam is provided inside the plastic shell;

the fixed end of the wire rope is connected to the crossbeam;

wherein a wire rope fixing block is provided inside the plastic shell, wherein the lock body and the wire rope fixing block are located on the same side of the crossbeam.

2. The method according to claim 1, where in the movable end of the wire rope is inserted into the lock body after passing through the crossbeam.

3. The method according to claim 1, where the fixed end of the wire rope is connected to the crossbeam through the wire rope fixing block.

4. The method according to claim 1, where in the crossbeam is set on an upper part or a lower part of the lock body.

5. The method according to claim 1, where in the lock body is a one-way lock body, and the lock body is made of metal.

6. The method according to claim 1, where in the crossbeam is made of metal or fiberglass.

7. The method according to claim 3, where in the wire rope fixing block includes an insertion section and a blocking section.

8. The method according to claim 7, where in the fixed end of the wire rope is fixedly connected to the insertion section of the wire rope fixing block.

9. The method according to claim 3, where in the wire rope fixing block is made of metal.

10. The method according to claim 1, where in the lock body is attached to the crossbeam.

11. A wire lock, comprising:

a plastic shell;

a wire rope;

and the plastic shell is embedded with an RFID chip and a lock body inside;

the wire rope comprises a fixed end and a movable end;

a crossbeam is provided inside the plastic shell;

the fixed end of the wire rope is connected to the crossbeam;

wherein a wire rope fixing block is provided inside the plastic shell, wherein the lock body and the wire rope fixing block are located on the same side of the crossbeam, the lock body is attached to the crossbeam.

12. The wire lock according to claim 11, where in the fixed end of the wire rope is connected to the crossbeam through the wire rope fixing block.

13. The wire lock according to claim 11, where in the crossbeam is set on an upper part or a lower part of the lock body.

14. The wire lock according to claim 11, where in the lock body is a one-way lock body, and the lock body is made of metal.

15. The wire lock according to claim 11, where in the crossbeam is made of metal or fiberglass.

16. The wire lock according to claim 11, where in the wire rope fixing block includes an insertion section and a blocking section.

17. The wire lock according to claim 16, wherein the fixed end of the wire rope is fixedly connected to the insertion section of the wire rope fixing block.

18. The wire lock according to claim 11, where in the wire rope fixing block is made of metal.

* * * * *